(12) United States Patent
Minard et al.

(10) Patent No.: US 7,905,243 B2
(45) Date of Patent: Mar. 15, 2011

(54) NO-DRIP CHECK VALVES

(75) Inventors: James J. Minard, South Beloit, IL (US); Mark E. Bush, Rockton, IL (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 12/296,295

(22) PCT Filed: Apr. 14, 2006

(86) PCT No.: PCT/US2006/014408
§ 371 (c)(1),
(2), (4) Date: Oct. 7, 2008

(87) PCT Pub. No.: WO2007/120137
PCT Pub. Date: Oct. 25, 2007

(65) Prior Publication Data
US 2009/0183779 A1    Jul. 23, 2009

(51) Int. Cl.
*E03B 1/00*    (2006.01)
(52) U.S. Cl. ............... 137/2; 137/846; 251/149.1
(58) Field of Classification Search ........... 251/149.1; 137/846, 2
See application file for complete search history.

(56) References Cited

U.S. PATENT DOCUMENTS

| | | | | |
|---|---|---|---|---|
| 3,451,419 A | * | 6/1969 | Coleman | 137/322 |
| 3,710,942 A | | 1/1973 | Rosenberg | |
| 3,788,598 A | * | 1/1974 | German et al. | 251/149.6 |
| 4,143,853 A | * | 3/1979 | Abramson | 251/149.1 |
| 4,498,658 A | * | 2/1985 | Mikiya | 251/149.6 |
| 6,520,939 B2 | | 2/2003 | Lafontaine | |
| 6,684,903 B2 | | 2/2004 | Williamson et al. | |
| 6,824,117 B2 | * | 11/2004 | Horton | 251/149.1 |

FOREIGN PATENT DOCUMENTS

| | | |
|---|---|---|
| CN | 1360668 A | 7/2002 |
| WO | WO-0077429 A1 | 12/2000 |

OTHER PUBLICATIONS

International Preliminary Report on Patentability mailed Feb. 2, 2009 (8 pgs.).

* cited by examiner

*Primary Examiner* — Stephen M Hepperle
*Assistant Examiner* — Macade Brown
(74) *Attorney, Agent, or Firm* — Marjama Muldoon Blasiak & Sullivan LLP

(57) ABSTRACT

A mechanism to check fluid flow from a tube or spigot when it is disconnected from a downstream conduit is provided. The mechanism includes a duckbill check valve that has its bills pointed in the upstream direction. To keep the bills apart for the fluid flow to continue, the downstream conduit has to be inserted against the underside of the bills. Once the downstream conduit separates from the valve, the valve closes itself.

11 Claims, 2 Drawing Sheets

નો-DRIP CHECK VALVES

NO-DRIP CHECK VALVES

TECHNICAL FIELD

The invention generally relates to check valves, connectors, and fittings that can be used in connection with any fluid conduit.

BACKGROUND OF THE INVENTION

Many types of fluid conduits can benefit from a re-closeable outlet end, especially if such re-closure is automatic. For example, for many bag-in-box types of storage and dispensing systems, a drainage tube or spigot typically extends out of the bag to deliver the fluid content of the bag. Whether the drainage tube or spigot delivers directly to a separate receptacle, e.g., a drinking cup, or is further connected to a second conduit for further processing, it would be desirable to have a mechanism to close the outlet end when delivery is not needed, e.g., when switching bags out of the box. For economical reasons, it is often advantageous that such a mechanism be provided in the form of a reusable device: a connector or fitting that can be attached and detached from various conduits' outlet ends.

SUMMARY OF THE INVENTION

The present invention relates to various features of an improved valve or closure device. The valve automatically closes itself and stops further delivery or drainage of the fluid when a downstream object, e.g., another conduit, is withdrawn from the valve.

In one aspect, the invention provides a method for closing an outlet of a fluid conduit. The method includes the step of providing a one-directional valve near the outlet of the fluid conduit. The valve has a pointed portion that points upstream and the pointed portion is biased to remain closed, thereby shutting off fluid flow. In one embodiment, the method further includes the step of providing a tubular body that houses the one-directional valve wherein the tubular body is detachable from the rest of the conduit. And the method may also include sealing the tubular body against the fluid conduit, e.g., by providing an annular barb on the outside of the tubular body to form a seal with the fluid conduit. In one feature, the method further includes inserting a downstream conduit from the outlet of the fluid conduit to push open the valve, thereby opening up fluid flow. The method can further include the step of attaching the outlet of the fluid conduit to the downstream conduit and forming a seal where the two come into contact.

In another aspect, the invention provides a device that includes a tubular body having an upstream inlet end and a downstream outlet end, and a one-directional valve inside the tubular body. The valve includes a pointed portion that points towards the upstream inlet end and the pointed portion is biased to remain closed. In one embodiment, the device further includes a retainer that retains the valve inside the tubular body of the device. In one feature, the pointed portion of the valve includes multiple lips that are biased to remain closed but can be forced open by an elongated object inserted through the downstream outlet end. In one embodiment, the lips include a pair of substantially flat portions facing each other. In one embodiment, the upstream inlet end has an annular barb. In one feature, the upstream inlet end of the device is configured to attach onto an upstream conduit. The upstream inlet end of the device forms a seal where it comes into contact with the upstream conduit. In another feature, the downstream outlet end of the device is configured to attach onto a downstream conduit; they may form a seal where they come into contact.

In a further aspect, the invention provides a method of making a device,
which includes the steps of:
(a) providing a tubular body having an upstream inlet end and a downstream outlet end; and
(b) enclosing a one-directional valve inside the tubular body, the valve having a pointed portion that points towards the upstream inlet end and wherein the pointed portion is biased to remain closed.

In one embodiment, the pointed portion has multiple lips biased to remain closed. In one feature, the method may further include providing a retainer that retains the valve inside the tubular body of the device.

BRIEF DESCRIPTION OF THE DRAWINGS

The foregoing, and other features and advantages of the invention, as well as the invention itself, will be more fully understood from the description, drawings and claims that follow. The drawings are not necessarily to scale, emphasis instead generally being placed upon illustrating the principles of the invention. In the drawings, like numerals are used to indicate like parts throughout the various views and various embodiments.

DETAILED DESCRIPTION OF THE INVENTION

Features of the invention may work by themselves or in combination as shall be apparent to one skilled in the art. The lack of repetition is meant for brevity and not to limit the scope of the claim. Unless otherwise indicated, all terms used herein have the same meaning as they would to one skilled in the art of the present invention.

The present invention can be used in and with any fluid conduit, e.g., tubes, manifolds, pipes, spigots, and so on. The present invention is particularly useful where a downstream conduit needs to be connected to an upstream one for fluid delivery, but when the two are disconnected, it is desirable to stop the fluid flow from the upstream conduit.

Figure 1:
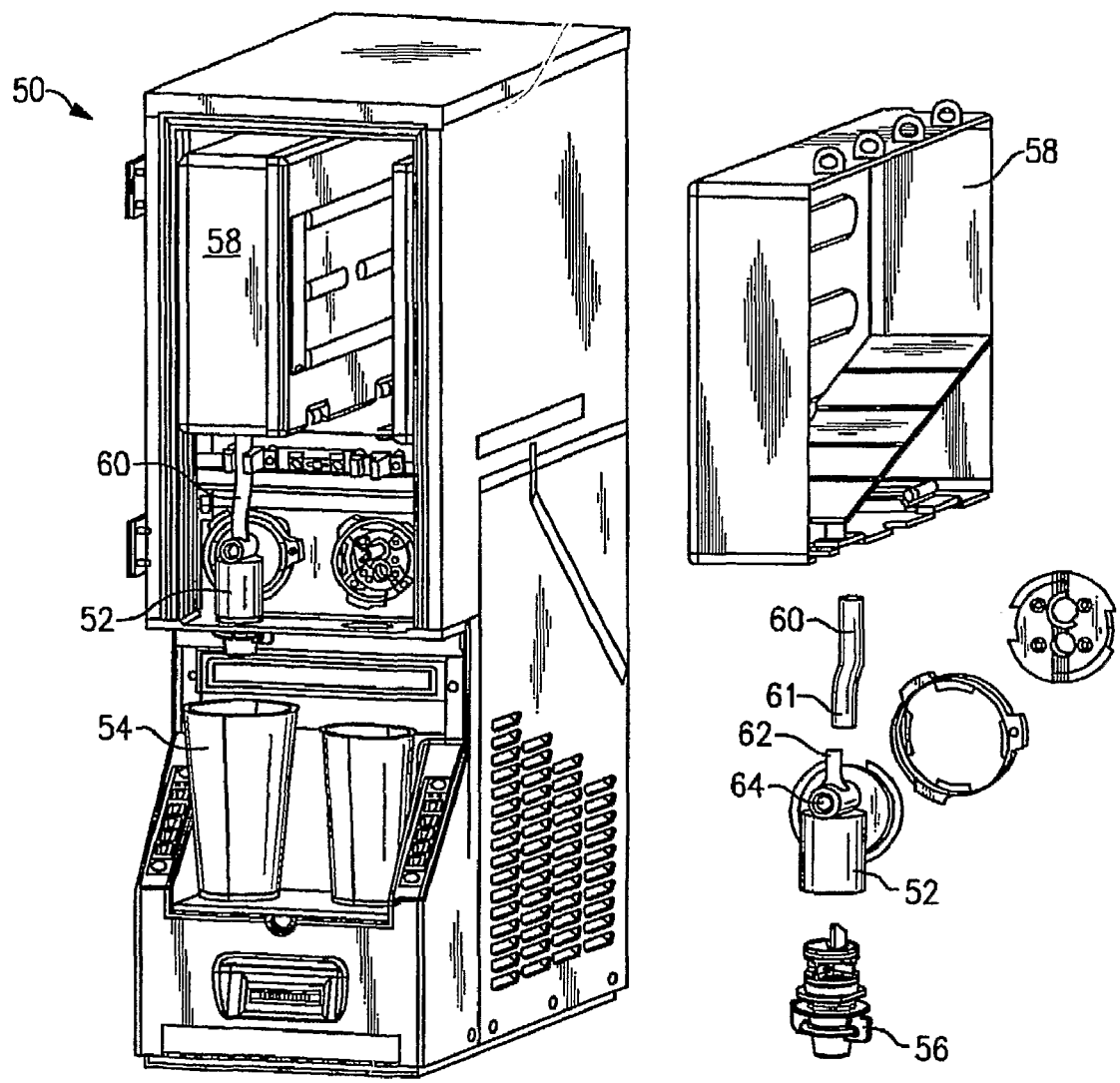
FIG. 1 is a perspective view of a dispenser with its front door removed and with part of the production line inside the dispenser in an exploded view on the right.

Referring to FIG. 1, an example where the present invention may be practiced is provided. A postmix beverage dispenser 50 is shown here with the front door removed, and one of the two parallel production lines is depicted in a partly exploded view on the right side. The dispenser 50 mixes a concentrate, e.g., orange juice concentrate, with a diluent, e.g., potable water, inside a mixing chamber 52 before dispensing the product into a receptacle 54 through a nozzle 56 that is housed, in part, inside the mixing chamber 52. The concentrate is delivered through a bag-in-box system where a sealed bag of the concentrate (not shown) is placed inside a holder 58. A drainage tube 60 extends from the bag and out of the holder 58, and the tube's outlet 61 is eventually attached to a tube adapter 62 on the top of a pump head 64. The pump head 64 houses a piston (not shown) that transfers the delivered concentrate into the mixing chamber 52 into which pressurized water is delivered as well. When the drainage tube 60 is removed from the tube adapter 62, e.g., to change the flavor of the concentrate for the dispenser 50, it would be desirable if the drainage tube 60 automatically closes or seals off its outlet end 61 so that the content does not spill out or drip. Further details of the postmix beverage dispenser 50 is provided in co-owned international application no. PCT/US2005/045087 filed on Dec. 12, 2005, the entire disclosure of which is hereby incorporated by reference to the extent permitted by relevant patent laws.

Figure 2:
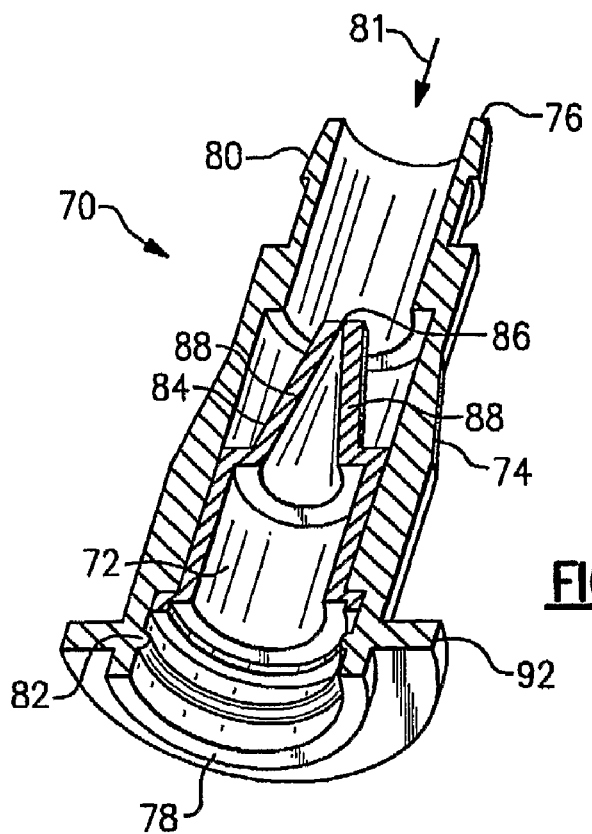
FIG. 2 is a perspective cut-away view of a valve fitting according to the present invention.
Figure 3:
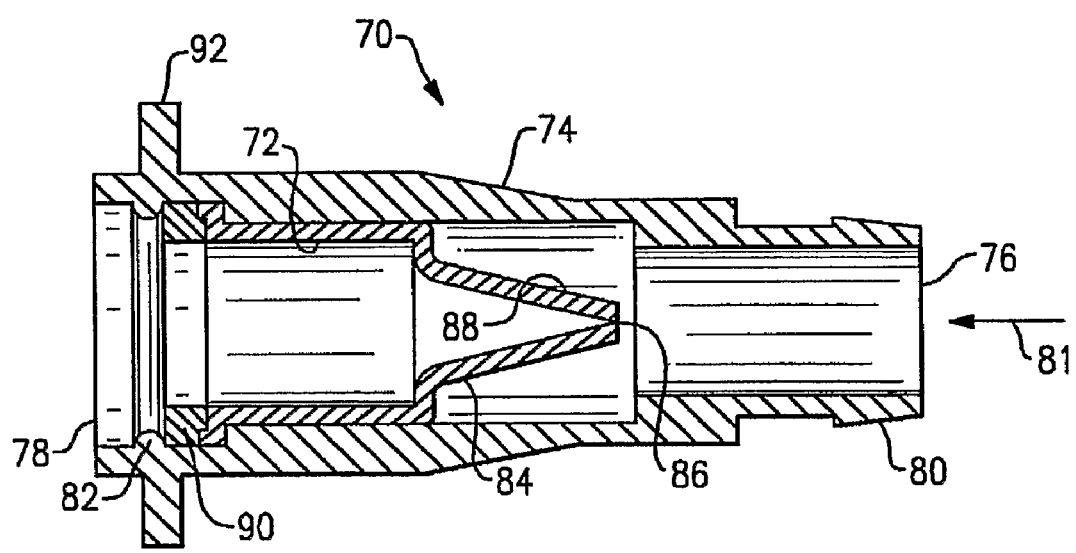
FIG. 3 is a cross-section view of the valve fitting depicted in FIG. 2.

Referring now to FIGS. 2 and 3, a connector or fitting 70 is provided with a one-directional valve or check valve 72 housed inside a tubular housing or body 74. The tubular body 74 has an upstream inlet end 76 and a downstream outlet end 78. The fitting's upstream inlet end 76 attaches to an upstream conduit, such as the drainage tube 60 (FIG. 1) from a bag of concentrate. The fitting's downstream outlet end 78 attaches to a downstream conduit, such as the tube adapter 62 (FIG. 1) of a pump head. Therefore, the direction of fluid flow inside the fitting is from end 76 to end 78, as indicated by the arrow 81. On both ends of the fitting 70, which can be sized to fit onto their corresponding connecting conduits, structures may be provided to ensure a seal is formed with the upstream or downstream conduit. In one embodiment, the upstream inlet end 76 has an annular barb 80 on the outside wall, and the downstream outlet end 78 has an annular ring 82 on the inside wall, to engage and seal against the corresponding conduit.

The valve 72 has a pointed portion 84 that points towards the upstream inlet end 76. The pointed portion 84 can have a variety of configurations that, in general, taper towards a closure point or slit 86. The pointed portion 84 is biased to remain closed or checked at the closure slit 86, preventing fluid flow through the fitting 70. The pointed portion 84 includes multiple lips 88 biased to remain closed. The pressure from the fluid inside the fitting 70, especially if the fitting is positioned in a vertical orientation with its inlet end 76 on top as shown in FIG. 2, helps to push the valve lips 88 shut. Accordingly, in some embodiments, the valve lips 88 do not need to be preloaded. Those lips 88, for example, can be a pair of substantially flat portions resembling duckbills facing each other. Such duckbill check valves are commercially available from manufacturers such as Red Valve Co., Inc. of Carnegie, Pa., Clippard Instrument Laboratory, Inc. of Cincinnati, Ohio, and Vernay Laboratories, Inc. of Yellow Springs, Ohio. The valves may be made of a variety of materials such as elastomeric compounds including rubber. In one embodiment, the valves are made by liquid silicone injection molding—valve manufacturers that use such technique include Liquid Molding System, Inc. of Midland, Mich. The valve 72 can also use other configurations and structures, such as umbrella valves, for the purpose of the present invention.

To open the valve 72, an elongated object, e.g., a downstream conduit (not shown), is inserted into the fitting 70 through its outlet end 78, in the direction opposite the arrow 81. Once the downstream conduit contacts the underside of the valve's pointed portion 84, the operator can use the conduit to apply the necessary pressure to force open the lips 88. In one way to use the invention, the operator thrusts the conduit past the lip's closure slit 86 until it lodges in the portion of the tubular body 74 that is upstream to the valve. Fluid flow in the direction of the arrow 81 will proceed from the fitting 70 into the downstream conduit.

When the downstream conduit is withdrawn or otherwise separates from the fitting 70, the valve lips 88 will close automatically, effectively shutting off the fluid flow. For fluids of relatively low viscosity such as some types of juice concentrates, it is preferred that the lips of the duckbill check valve be elongated and/or thin so that they remain checked in the closed position and little or no leakage or dripping results.

The valve can be reopened when the downstream conduit is inserted back in and past the valve. A retainer 90 (FIG. 3) can be found downstream from the valve 72, resting against the annular ring 82, to prevent the valve 72 from being removed with the downstream conduit from the tubular body 74.

Still referring to FIGS. 2 and 3, the fitting 70 may also have an integrated collar 92 to aid in the removal and connection to the upstream and downstream conduits. The collar 92 can also act as a locator to prevent abnormal insertion.

The fitting 70 can be made integrally with the upstream conduit, of course, such that the tubular body 74 is simply an integral portion of the conduit and constitutes part of its discharging/outlet end. A detachable fitting 70, as depicted in FIGS. 2 and 3, however, allows reuse of the check valve 72 for different conduits and connections. Other aspects of making and using the invention, the embodiments of which have been described, would be obvious to one skilled in the art.

While the invention has been described with certain embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A valve device for a beverage dispenser comprising:
   a tubular body having an upstream inlet end, a downstream outlet end, and an internal cavity having a first annular wall with a first radius, a second annular wall with a second radius larger than the first radius, and a shoulder transitioning between the first annular wall and the second annular wall; and
   a one-directional valve inside the tubular body, the valve comprising a pointed portion that points towards the upstream inlet end and wherein the pointed portion is biased to remain closed, wherein the downstream outlet end of the tubular body is configured to attach onto a downstream conduit and further wherein the pointed portion of the valve comprises multiple lips biased to remain closed and adapted to be forced open by the downstream conduit inserted through the downstream outlet end to allow for the flow of a fluid from the upstream inlet end and to the downstream outlet end and further wherein the downstream outlet end of the tubular body includes a radially inwardly extending annular ring fixed stationary to the second annular wall and with respect to the tubular body, the downstream conduit being adapted to sealingly engage when inserted into the downstream outlet end of the tubular body; and
   a retainer that rests against the annular ring and that retains the valve inside the tubular body of the device.

2. The device of claim 1, wherein the lips comprise a pair of substantially flat portions facing each other.

3. The device of claim 1, wherein the upstream inlet end comprises an annular barb.

4. The device of claim 1, wherein the upstream inlet end is configured to attach onto an upstream conduit.

5. The device of claim 4, wherein the upstream inlet end of the tubular body is configured to form a seal where it comes into contact with an outlet of the upstream conduit.

6. A method for regulating a fluid flow in a beverage dispenser, comprising the steps of:
   providing a one-directional valve near the outlet of an upstream conduit, the valve comprising a pointed portion that points upstream and wherein the pointed portion is biased to remain closed, thereby shutting off fluid flow, the valve housed in a tubular body having an upstream end and a downstream outlet end, and an internal cavity having a first annular wall with a first radius, a second annular wall with a second radius larger than the first radius, and a shoulder transitioning between the first annular wall and the second annular wall, said downstream outlet end having a radially inwardly extending ring fixed stationary to the second annular wall with respect to said tubular body;

providing a retainer resting against the ring and retaining the valve inside the tubular body of the device; and providing a downstream conduit for insertion into the downstream outlet end of the tubular body to push open the valve, thereby opening up fluid flow, said downstream conduit being adapted to sealingly engage with said radially inwardly extending ring.

7. The method of claim 6, further comprising sealing the tubular body against the upstream conduit.

8. The method of claim 7, further comprising providing an annular barb on the outside of the tubular body to form a seal with the upstream conduit.

9. The method of claim 6, wherein the pointed portion of the valve comprises multiple lips biased to remain closed.

10. The method of claim 9, wherein the lips comprise a pair of substantially flat portions facing each other.

11. A valve device for a beverage dispenser comprising:

a tubular body having an upstream inlet end and a downstream outlet end;

a one-directional valve inside the tubular body, the valve comprising a pointed portion that points towards the upstream inlet end and wherein the pointed portion is biased to remain closed, wherein the downstream outlet end of the tubular body is configured to attach onto a downstream conduit and further wherein the pointed portion of the valve comprises multiple lips biased to remain closed and adapted to be forced open by the downstream conduit inserted through the downstream outlet end to allow for the flow of a fluid from the upstream inlet end and to the downstream outlet end and further wherein the downstream outlet end of the tubular body includes a radially inwardly extending annular ring fixed stationary with respect to the tubular body and with which the downstream conduit is adapted to sealingly engage when inserted into the downstream outlet end of the tubular body; and a retainer resting against the annular ring and retaining the valve inside the tubular body of the device.

\* \* \* \* \*